United States Patent
Khan et al.

(10) Patent No.: US 11,296,642 B2
(45) Date of Patent: Apr. 5, 2022

(54) ELECTRIC MACHINE TORQUE CONTROL SYSTEM

(71) Applicant: FORD GLOBAL TECHNOLOGIES, LLC, Dearborn, MI (US)

(72) Inventors: Mohammad Sameer Khan, Farmington Hills, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 16/707,751

(22) Filed: Dec. 9, 2019

(65) Prior Publication Data
US 2021/0175832 A1 Jun. 10, 2021

(51) Int. Cl.
*H02P 27/08* (2006.01)
*H02P 23/14* (2006.01)

(52) U.S. Cl.
CPC .............. *H02P 27/08* (2013.01); *H02P 23/14* (2013.01)

(58) Field of Classification Search
CPC ................................. H02P 27/08; H02P 23/14
See application file for complete search history.

(56) References Cited

U.S. PATENT DOCUMENTS

| | | | |
|---|---|---|---|
| 2015/0149005 A1* | 5/2015 | Luedtke | H02P 21/20 701/22 |
| 2016/0141982 A1 | 5/2016 | Yim et al. | |
| 2017/0099023 A1* | 4/2017 | Attarian | H02P 6/085 |
| 2017/0257049 A1* | 9/2017 | Jing | H02P 6/15 |

* cited by examiner

*Primary Examiner* — Kawing Chan
*Assistant Examiner* — Bradley R Brown
(74) *Attorney, Agent, or Firm* — David B Kelley; Brooks Kushman P.C.

(57) ABSTRACT

A vehicle includes a battery, an electric machine, a rotor position sensor, an inverter, and a controller. The electric machine is configured to propel the vehicle. The electric machine has a stator and a rotor. The inverter is disposed between the battery and the electric machine. The inverter is configured to convert DC electrical power from the battery into AC electrical power. The inverter is configured to deliver the AC electrical power to the electric machine. The controller is programmed to adjust the offset position of the rotor position senor and control the torque of the electric machine based on the offset position of the rotor position sensor.

19 Claims, 4 Drawing Sheets

ELECTRIC MACHINE TORQUE CONTROL SYSTEM

TECHNICAL FIELD

The present disclosure relates to hybrid/electric vehicles and control systems for hybrid vehicles.

BACKGROUND

Hybrid/electric vehicles may have an electric machine that is configured to propel the vehicle.

SUMMARY

A vehicle includes a battery, an electric machine, a rotor position sensor, an inverter, and a controller. The electric machine is configured to propel the vehicle. The electric machine has a stator and a rotor. The inverter is disposed between the battery and the electric machine. The inverter is configured to convert DC electrical power from the battery into AC electrical power. The inverter is configured to deliver the AC electrical power to the electric machine. The inverter is also configured to convert AC electrical power from the electric machine into DC electrical power. The inverter is also configured to deliver the DC electrical power to the battery. The controller is programmed to, receive a signal from the rotor position sensor that is indicative of an angular position of the rotor responsive to the inverter operating in a first switching mode, control an electric current being delivered to the stator relative to the angular position of the rotor to drive a first estimated torque of the electric machine toward a commanded torque; calculate a measured torque of the electric machine based on rotational speed of the rotor and a DC electrical power input from the battery to the electric machine via the inverter and responsive to a difference between the measured torque and the first estimated torque exceeding a threshold, adjust the signal from the rotor position sensor to include a first offset value and control the electric current being delivered to the stator relative to the angular position plus the first offset value to drive the first estimated torque of the electric machine toward a commanded torque.

A vehicle includes a battery, an electric machine, a rotor position sensor, an inverter, and a controller. The electric machine is configured to propel the vehicle. The electric machine has a stator and a rotor. The inverter is disposed between the battery and the electric machine. The inverter is configured to convert DC electrical power from the battery into AC electrical power. The inverter is configured to deliver the AC electrical power to the electric machine. The inverter is also configured to convert AC electrical power from the electric machine into DC electrical power. The inverter is also configured to deliver the DC electrical power to the battery. The controller is programmed to, receive a signal from the rotor position sensor that is indicative of an angular position of the rotor; responsive to the inverter operating in a first switching mode, control an electric voltage being delivered to the stator relative to the angular position of the rotor to drive a first estimated torque of the electric machine toward a commanded torque; calculate a measured torque of the electric machine based on rotational speed of the rotor and a DC electrical power input from the battery to the electric machine via the inverter; and responsive to a difference between the commanded torque and the measured torque or to a difference between the commanded torque and the first estimated torque exceeding a threshold, adjust the signal from the rotor position sensor to include a first offset value and control the electric current being delivered to the stator relative to the angular position plus the first offset value to drive the first estimated torque of the electric machine toward the commanded torque.

A vehicle includes a battery, an electric machine, a rotor position sensor, an inverter, and a controller. The electric machine is configured to propel the vehicle. The electric machine has a stator and a rotor. The inverter is disposed between the battery and the electric machine. The inverter is configured to convert DC electrical power from the battery into AC electrical power. The inverter is configured to deliver the AC electrical power to the electric machine. The inverter is also configured to convert AC electrical power from the electric machine into DC electrical power. The inverter is also configured to deliver the DC electrical power to the battery. The controller is programmed to, receive a signal from the rotor position sensor that is indicative of an angular position of the rotor; responsive to the inverter operating in a first switching mode, control an electric current being delivered to the stator relative to the angular position of the rotor to drive a first estimated torque of the electric machine toward a commanded torque; responsive to the inverter operating in a second switching mode, control an electric voltage being delivered to the stator relative to the angular position of the rotor to drive a second estimated torque of the electric machine toward the commanded torque; calculate a measured torque of the electric machine based on rotational speed of the rotor and a DC electrical power input from the battery to the electric machine via the inverter circuit; responsive to a transition from the first mode to the second mode resulting in a corresponding change in the DC electrical power input exceeding a first threshold and to a difference between the commanded torque and the second estimated torque or a difference between the commanded torque and the measured torque after the transition exceeding a second threshold, adjust the signal from the rotor position sensor to include a first offset value and control the electric voltage being delivered to the stator relative to the angular position plus the first offset value to drive the second estimated torque of the electric machine toward the commanded torque; and responsive to a transition from the second mode to the first mode resulting in a corresponding change in the DC electrical power input exceeding a third threshold and the difference between the commanded torque and the second estimated torque or the difference between the commanded torque and the measured torque before the transition exceeding a fourth threshold, adjust the signal from the rotor position sensor to include a second offset value and control the electric current being delivered to the stator relative to the angular position plus the second offset value to drive the first estimated torque of the electric machine toward the commanded torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
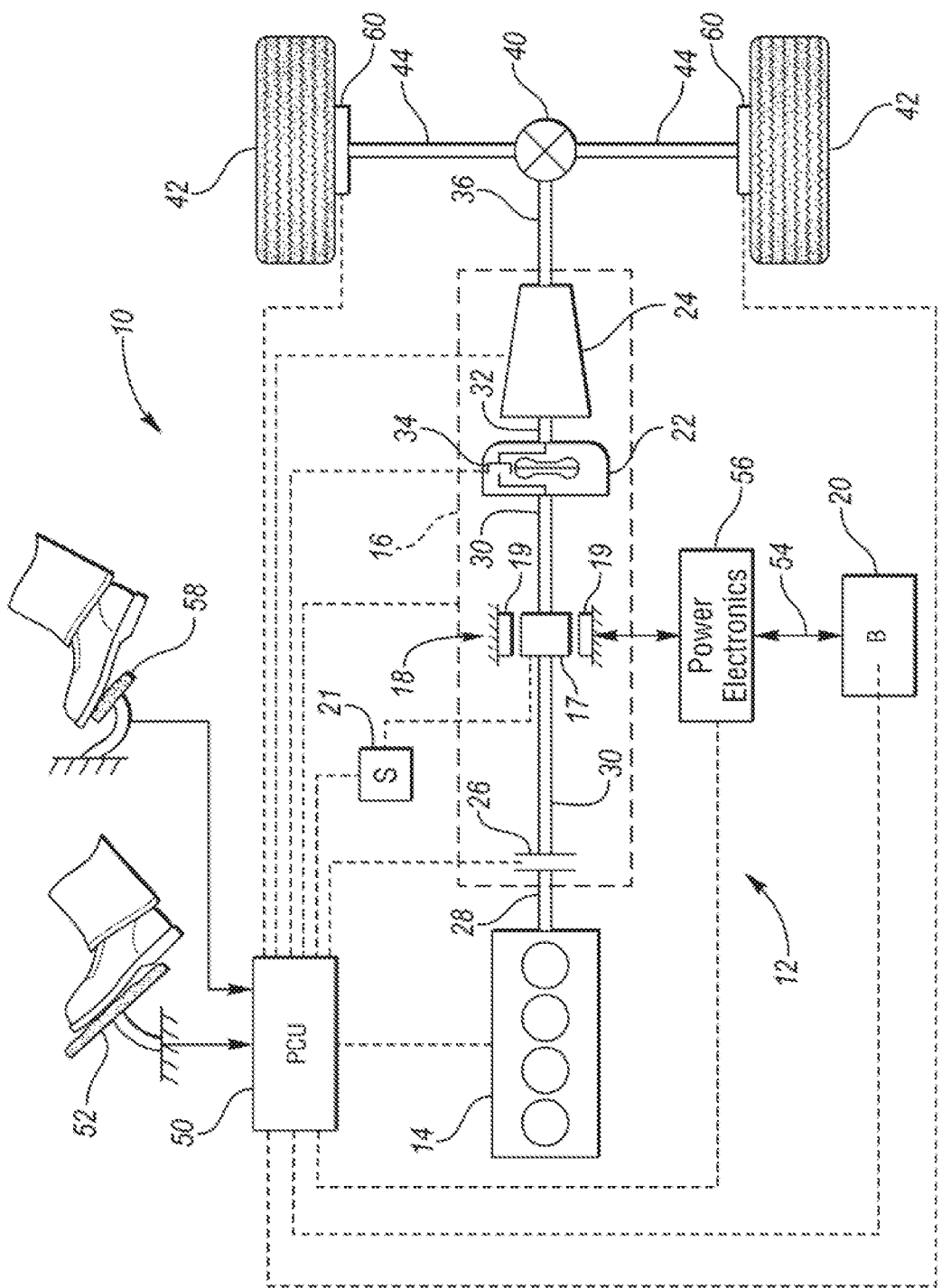
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The M/G 18 may include a rotor 17 and a stator 19. A rotor position sensor 21, such as a resolver, may be configured to communicate (i.e., send and receive signals) the position of the rotor 17 relative to the stator 17 to a controller (e.g., controller 50 described below) for the purposes of controlling the speed, torque, and/or power of the M/G 18. The rotor position sensor 21 may be affixed directly to the rotor 17 or to a shaft that is connected to the rotor 17, which is configured to transfer the power and torque of the M/G 18 to other components within the powertrain 12 (e.g., see M/G shaft 30 below).

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, MG 18 may be a permanent magnet synchronous motor. Power electronics condition direct current (DC) power provided by the battery 20 to the requirements of the M/G 18, as will be described below. For example, power electronics may provide three phase alternating current (AC) to the MG 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (IO) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake % exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the MG 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
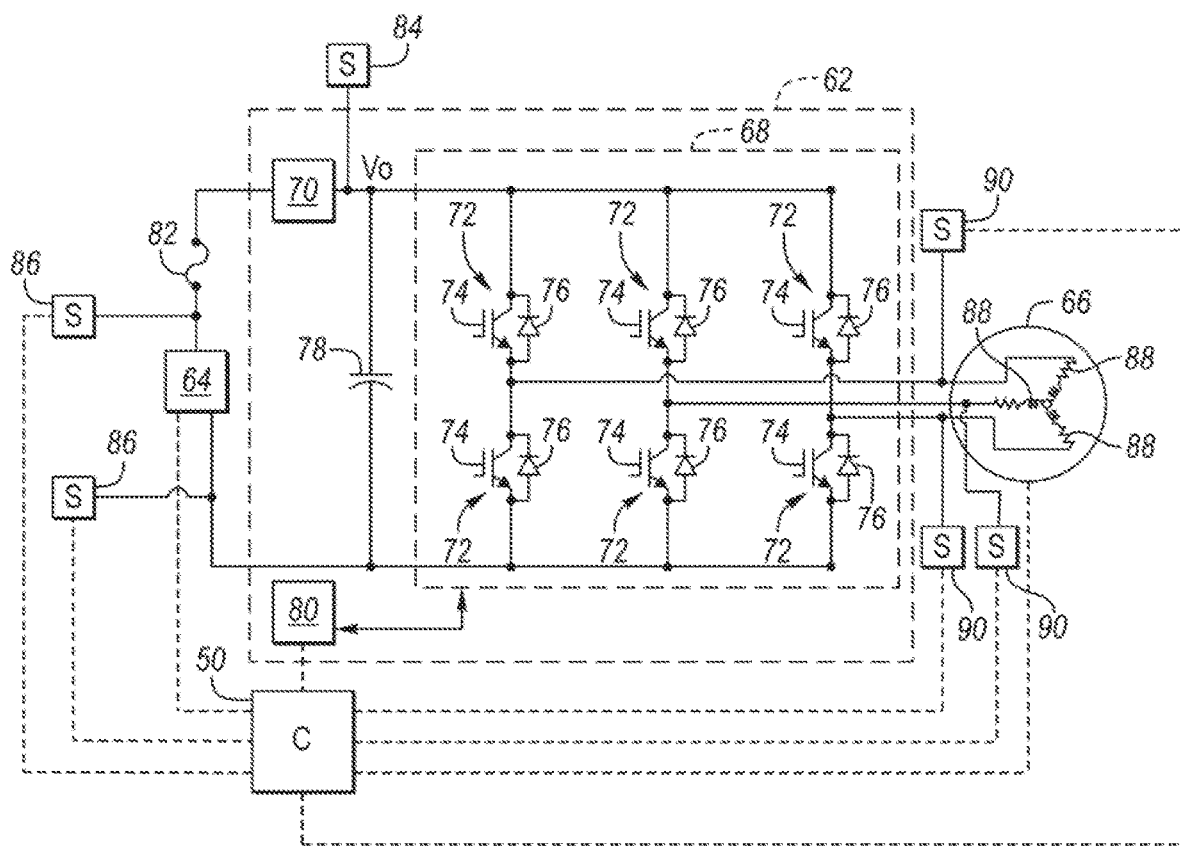
FIG. 2 is a circuit diagram of a power controller illustrating an inverter that is coupled to a DC power source and an electric machine.

Referring to FIG. 2, a circuit diagram of a power controller (or power supply device) 62 coupled to a power source 64 (e.g., battery 20) and an electric machine 66 (e.g., M/G 18) is illustrated. The power source 64 may be coupled to the power controller 62 in order to drive the electric machine 66. The power controller 62 may include an inverter 68 and a voltage converter 70. The voltage converter 70 may be DC to DC converter. Alternatively, the voltage converter 70 may be a separate component that is not integral to the power controller 62. The inverter 68 and the voltage converter 70 may be configured to deliver electrical power to the electric machine 66.

The inverter 68 includes inverting circuitry. The inverting circuitry may include switching units 72. The switching units 72 may each comprise a transistor 74, such as an insulated gate bipolar transistor (IGBT), in antiparallel with a diode 76. The switching units 72 may be configured to provide alternating current to the electric machine 66. More specifically, the inverter 68 may be configured to convert direct electrical current provided by the power source 64 into alternating electrical current, which is then delivered to the electric machine 66. The power controller 62 may include a linking capacitor 78. The linking capacitor 78 may be disposed between the power source 64 and the inverter 68. The linking capacitor 78 may be configured to absorb ripple currents generated at the inverter 68 or the power source 64, and stabilize the DC-link voltage, Vo, for inverter 68 control. Stated in other terms, the linking capacitor 78 may be arranged to limit voltage variation at an input of inverting circuitry due to ripple currents generated by the inverting circuitry or a battery, such as a traction battery, that may comprise the power source 64. The power controller 62 may include a drive board 80 for controlling the inverting circuitry. The drive board 80 may be a gate drive board that is configured to operate the transistors 74 of the switching units 72 of the inverter 68 when converting the direct current of the power source 64 into alternating current and delivering the alternating current to the electric machine 66.

The voltage converter 70 may include an inductor. The circuitry of the voltage converter (not shown), including the inductor, may be configured to amplify or increase the voltage of the electrical power being delivered to the electric machine 66 from the power source 64. A fuse 82 may be disposed on the direct current side of the inverter 68 to protect the inverting circuitry from surges in electrical power.

The disclosure should not be construed as limited to the circuit diagram of FIG. 2, but should include power control devices that include other types inverters, capacitors, converters, or combinations thereof. For example, the inverter 68 may be an inverter that includes any number of switching units and not be limited to the number of switching units depicted in FIG. 2. Alternatively, the linking capacitor 78 may be configured to couple one or a plurality of inverters to a power source.

The controller 50 may be in communication with the power source 64 (e.g., battery 20), the electric machine 66 (e.g., M/G 18), and the drive board 80. In response to a command to provide torque and power to propel the HEV 10, the controller 50 may operate the power source 64, drive board 80, and electric machine 66 such that the desired power is delivered to the electric machine 66 from the power source 64 via the inverter 68 of the power controller 62. The power, electrical voltage, and/or electrical current may be monitored at various points within the system and communicated to and/or adjusted via the controller 50 to obtain the desired torque and/or power output the electric machine 66. The DC power, DC electrical voltage, and/or DC electrical current that is being delivered to the inverter 68 may be determined by sensor 84. The DC power, DC electrical voltage, and/or DC electrical current that is being generated by the power source 64 may be determined by one or more sensors 86. The AC power, AC electrical voltage, and/or AC electrical current that is being delivered to each winding phase 88 of the electric machine 66 may be determined by one or more sensors 90. The controller 50 may include an algorithm that converts the various measurements to a torque or power being output of the electric machine 66.

The purpose of this disclosure is to detect and correct an offset error in the rotor position sensor 21. The correct position offset of the rotor position sensor 21 results in a more accurate torque monitoring control of the M/G 18. Identifying the correct position sensor offset may also help in avoiding an unintended vehicle acceleration and/or an unintended vehicle motion. The rotor position is utilized by software within the controller 50 to control the inverter 68 in order to accurately control either the current or the voltage of the M/G 18 in order to drive the M/G 18 toward a desired or commanded torque.

The drive control strategy of the M/G 18 may be optimized for minimum loss and high DC voltage utilization. Such a drive control strategy operates the inverter 68 to drive the M/G 18 under a pulse width modulation (PWM) switching mode or under a six-step switching mode based on speed and torque commands to the M/G 18. In the PWM switching mode, the electric current of the M/G 18 is controlled. In the six-step switching mode the electric voltage of the M/G 18 is controlled. Also, such a drive control strategy is configured to transition between the PWM switching mode and the six-step switching mode at predefined motor speeds based on the DC voltage of the battery 20 or the DC voltage being input into the inverter 68. The output torque of the M/G 18 has a higher sensitivity to the voltage of the M/G 18 when compared to the current of the M/G 18. In this disclosure, the difference in sensitivity of the voltage and current of the M/G 18 is utilized to detect a position error of the rotor position sensor 21 and to take appropriate corrective action. The inverter 68 may also include circuitry (e.g., rectifying circuitry—not show) that is configured to convert AC electrical power from the electric machine 66 into DC electrical power. The DC power may then be delivered to power source 64 to recharge the power source 64.

In the drive control strategy, the DC voltage from the power source 64 needs to be converted to AC voltage by the inverter circuitry 68 for AC motor operation. This DC to AC Voltage conversion in the inverter could either be achieved through pulse width modulation or six-step switching technique.

Although, there are many PWM switching schemes that exist, all the techniques have the same aim to essentially vary duty cycle for inverter switches 74 (IGBT/MOSFET) at a high switching frequency to achieve a commanded average lower frequency output voltage or current. The PWM technique is typically utilized for a closed loop motor current control, where the motor current command is compared with the motor current feedback from sensor 90 to generate the lower frequency voltage command through a closed loop current controller. This lower frequency voltage command is utilized in this technique to create high switching frequency duty cycle for inverter switches In a six-step switching technique, a specific phase of the three-phase motor could be alternately switched between positive and negative pole of the battery such that particular phase is alternatively in series with the remaining two phase connected in parallel or is in parallel with one of the other phases and in series with the third phase. The voltage drop across each motor phase could either take ⅓ or ⅔ of the battery voltage and the polarity of the voltage drop depends whether the phase is connected to positive or negative pole of the battery. This switching technique is called six-step because the six-steps form a waveform of the phase voltage drop of the motor. The six-step switching technique is typically used for open loop motor voltage control.

Although the method proposed in this disclosure could be used in all types of electric motors or machines, the solution may be described particularly based an interior permanent magnet synchronous motor (IPMSM). The same approach could be generalized and used to detect and take corrective actions for position sensor offset errors in other electric motors or machines.

The IPMSM, which may include M/G 18, can be mathematically modelled based on equations (1) and (2):

$$V_s^e = \begin{bmatrix} v_d^e \\ v_q^e \end{bmatrix} = \begin{bmatrix} R_s + sL_d & -w_r L_q \\ w_r L_d & R_s + sL_q \end{bmatrix} \begin{bmatrix} i_d^e \\ i_q^e \end{bmatrix} + \begin{bmatrix} 0 \\ w_r \lambda_{pm} \end{bmatrix} \quad (1)$$

$$I_s^e = \begin{bmatrix} i_d^e \\ i_q^e \end{bmatrix} \quad (2)$$

where $V_s^e$ is the motor terminal voltage vector in the rotor reference frame, $I_s^e$ is the motor armature (e.g., stator 19) current vector in the rotor reference frame, $v_d^e$ and $v_q^e$ are the D axis and Q axis components of the motor armature voltage in the rotor reference frame, respectively, $R_s$ is the motor armature resistance, $L_d$ and $L_q$ are the D axis and Q axis components of the motor armature self-inductance, respectively, $w_r$ is the angular speed of the motor, or more particularly the speed of the rotor of the motor, $i_d^e$ and $i_q^e$ are the D axis and Q axis components of the motor armature current in rotor reference frame, respectively, and $\lambda_{pm}$ is the flux linkage of permanent magnet rotor.

The electromagnetic Torque ($T_e$) of an IPMSM can be mathematically modelled based on equations (3) and (4):

$$T_e = \frac{3}{2}\frac{P}{2}(\lambda_{pm} i_q^e + L_{diff} i_d^e i_q^e) \quad (3)$$

$$T_e = \frac{3}{2}\frac{P}{2}\left(\lambda_{pm} I_s^e \cos\beta + \frac{1}{2} L_{diff} I_s^{e2} \sin 2\beta\right) \quad (4)$$

where P is the pole pairs of the electric motor, $L_{diff}$ is the difference in D and Q axis armature self-inductance, and $\beta$ is phase angle of the motor armature current in rotor reference frame.

The steady state D axis current ($i_d^e$) and Q axis current ($i_q^e$) of the motor armature may be mathematically modelled based on equations (5) and (6):

$$i_d^e = \frac{v_q^e}{L_d w_r} - \frac{\lambda_{pm}}{L_d} \quad (5)$$

$$i_d^e = -\frac{v_q^e}{L_q w_r} \quad (6)$$

The electromagnetic torque of the Torque ($T_e$) of an IPMSM may also be mathematically modelled terms of the voltage of the armature (e.g., stator 19) under a steady state condition based on equations (7) and (8):

$$T_e = \frac{3P}{4 L_d L_q w_r^2}(L_q w_r \lambda_{pm} v_d^e + L_{diff} v_q^e v_d^e) \quad (7)$$

-continued $$T_e = -\frac{3P}{8L_d L_q w_r^2}(2L_q w_r \lambda_{pm} V_s^e \cos\theta + L_{diff} V_s^{e^2} \sin 2\theta) \quad (8)$$

where θ is the phase angle of the motor armature voltage in the rotor reference frame.

When the motor (e.g., M/G 18) is being operated in the PWM mode, it may be operated according to a maximum torque per ampere (MTPA) Control and the current angle may be mathematically modelled based on equation (9):

$$\beta = \sin^{-1}\left(\frac{-\lambda_{pm} + \sqrt{\lambda_{pm}^2 + 8(L_{diff} I_s^e)^2}}{4L_{diff} I_s^e}\right) \quad (9)$$

While operating in the PWM switching mode, the signal from rotor position sensor 21 plus an offset value represents the phase angle of the motor armature (e.g., stator 19) current, β, which is in turn utilized to control the electromagnetic Torque, $T_e$, of the motor according to equation (4). While operating in the six-step switching mode, the signal from rotor position sensor 21 plus an offset value represents the phase angle of the motor armature voltage, θ, which is in turn utilized to control the electromagnetic Torque, $T_e$, of the motor according to equation (8). The solution described herein assumes that the controller (e.g., controller 50) is able to control the electric motor (e.g., M/G 18) in the PWM switching mode and the six-step switching mode, and that the system (e.g., M/G 18, battery 20, inverter 68, associated controller 50, etc.) is free of any faults that may affect the controllability of the system. The controllability faults may be detected and action may be taken as per the respective algorithms described below.

For a control system of an electric motor or machine that utilizes a rotor position sensor, an error in the position offset of the rotor position sensor would produce a noticeable change in output torque of the motor, a noticeable change in the DC power output of the power source (e.g., battery 20), or a noticeable change in the DC power being input into the inverter (e.g., inverter 68) when the system transitions from the PWM switching mode to the six-step switching mode or vice versa. Such a discrepancy in the output torque of the motor, the DC Power output of the power source, or the DC power being input into the inverter (e.g., inverter 68) when transitioning between the PWM or six-step switching modes is observed due to difference in sensitivity of motor electromagnetic torque to voltage vector angle error and current vector angle error, at a similar drive operating point in terms of DC voltage, motor speed, and motor torque command. Generally, the electromagnetic torque of the motor is more sensitive to an error in the voltage vector angle, θ, than to an error in current vector angle, β. The position error would produce a noticeable torque difference, which could be observed as a noticeable difference in the DC power of the system (i.e., motor, power source, inverter, controller, etc.) between the PWM switching mode and the six-step switching mode, just before and after transitioning between the PWM switching mode and the six-step switching mode. The output torque of the motor can be estimated or measured from the drive DC power being output from the power source (e.g., battery 20) and into the inverter (e.g., inverter 68), motor shaft or rotor speed, and the efficiency of the system (e.g., the efficiency of the battery 20, inverter 68, and M/G 18).

Figure 3:
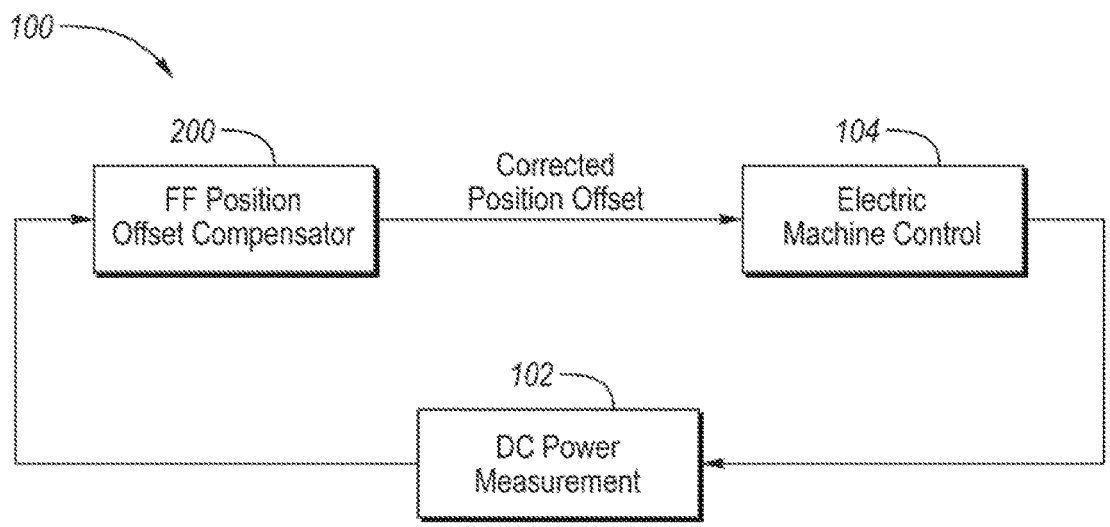
FIG. 3 is a flowchart illustrating a feed-forward control method for correcting an offset error of a rotor position sensor of an electric machine.
Figure 4A:
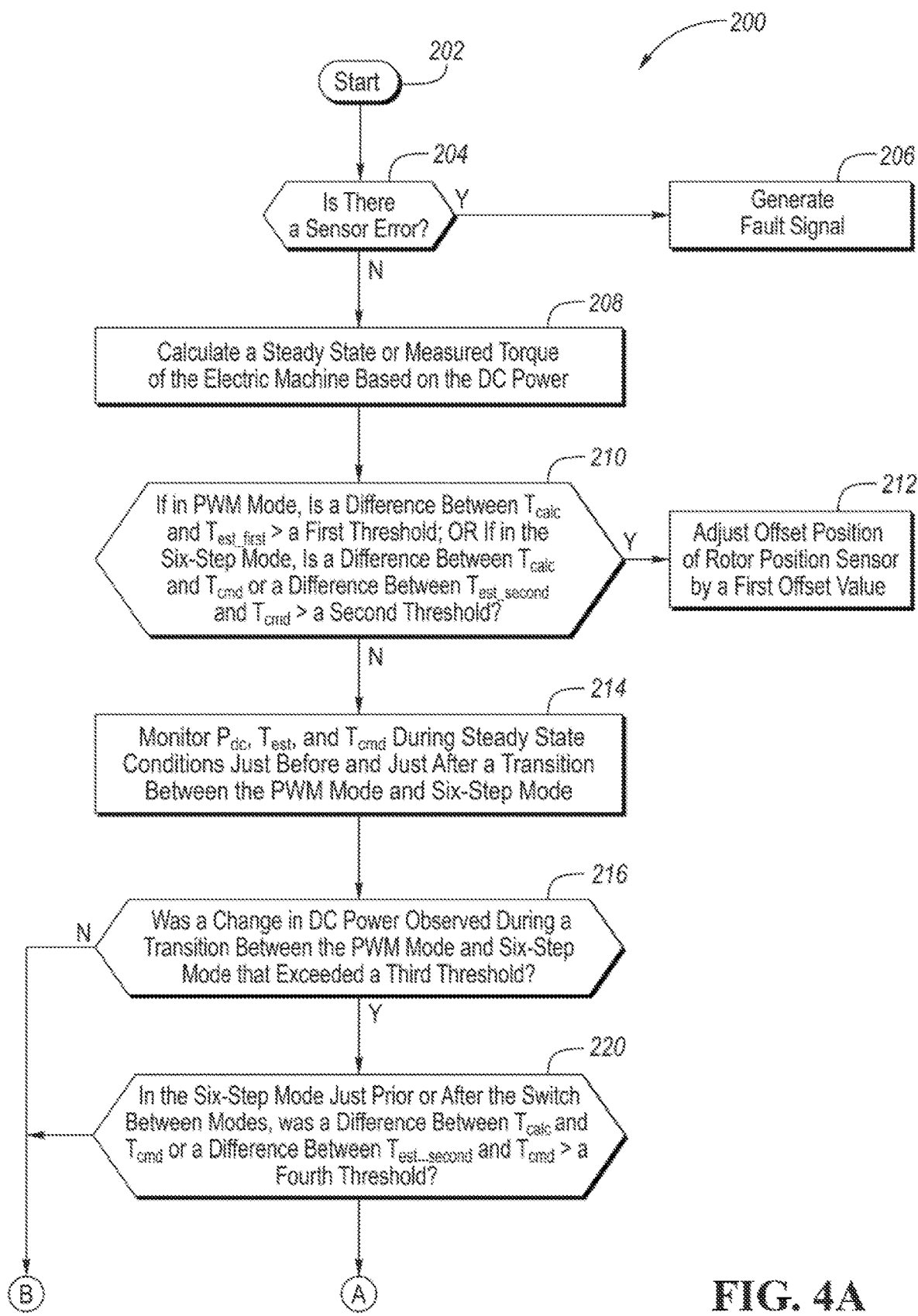
FIGS. 4A and 4B are a flowchart illustrating a feedforward control algorithm for correcting the offset error of the rotor position sensor of the electric machine.
Figure 4B:
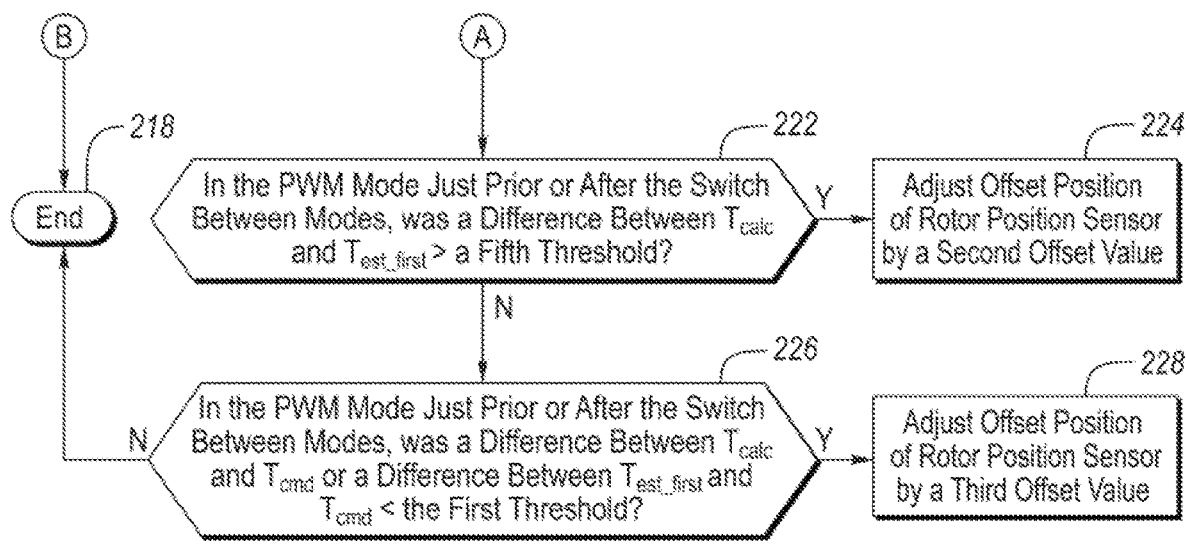

Referring to FIGS. 3, 4A, and 4B, a feed-forward control method 100 for correcting an offset error of the rotor position sensor 21 and a feed-forward control algorithm 200 for correcting the offset error of the rotor position sensor 21 are illustrated, respectively. The methods, algorithms, control actions, etc. described in FIGS. 3 and 4 may be stored as control logic and/or an algorithm within the controller 50.

Referring specifically to FIG. 3, a measurement of the DC power 102 being output from the power source (e.g., battery 20) or the DC power being delivered to the inverter 68 is input into the feed-forward control algorithm 200. The feed-forward control algorithm 200 utilizes the DC power measurement to correct an offset position of the rotor position sensor 21, which is then fed into electric machine control block 104. At block 104, the power source (e.g., battery 20), the inverter (e.g., inverter 68), and the electric machine (e.g., M/G 18) are controlled to drive the torque of the electric machine toward a commanded torque, $T_{cmd}$. The commanded torque, $T_{cmd}$, may be based on a position of the accelerator pedal 52. If the system is operating in the PWM switching mode, the current of the armature (e.g., stator 19) is controlled according equation (4) and the corrected offset of the rotor position sensor 21 is input into equation (4) as the phase angle, β, of the motor armature current, $I_s^e$, to drive the torque, $T_e$, of the electric machine toward the commanded torque, $T_{cmd}$. When utilizing equation (4) the torque, $T_e$, of the electric machine may be referred to as a first estimated torque, $T_{est\_first}$. If the system is operating in the six-step switching mode, the voltage of the armature (e.g., stator 19) is controlled according equation (8) and the corrected offset of the rotor position sensor 21 is input into equation (8) as the phase angle, θ, of the motor armature voltage, $V_s^e$, to drive the torque, $T_e$, of the electric machine toward the commanded torque, $T_{cmd}$. When utilizing equation (8) the torque, $T_e$, of the electric machine may be referred to as a second estimated torque, $T_{est\_second}$.

Referring specifically now to FIGS. 4A and 4B, the feed-forward algorithm 200 is initiated at start block 202. The feed-forward algorithm 200 then moves on to block 204 where the feed-forward algorithm 200 checks for any potential sensor errors through a current checksum algorithm or any similar algorithm that checks for any potential issue with a sensor that detects the current, voltage, or power within the system (e.g., the system checks for errors in the sensors 84, 86, and/or 90). If there is an error with one or more of the sensors, then the feed-forward algorithm 200 moves on to block 206. At block 206, the feed-forward algorithm 200 generates a sensor error fault/warning and may exit from further processing until the current sensor fault/warning is cleared. If there is not an error with one or more of the sensors, then the feed-forward algorithm 200 moves on to block 208 where various parameters within the system are measured and a steady state motor torque, $T_{calc}$, based on these measured parameters is calculated. The calculated motor torque, $T_{calc}$, may therefore be referred to as a measured torque of the motor or electric machine (e.g., M/G 18). Specifically, the measured motor torque, $T_{calc}$, may be estimated based on the measured DC power, $P_{dc}$, being output by the power source (e.g., battery 20), a drive shaft speed, ω, (e.g., the speed of the rotor 17 or M/G shaft 30 which may be measured by a sensor), and the efficiency of the system, t (e.g., the efficiency of the battery 20, inverter 68, M/G 18, controller 50, etc.).

The measured motor torque, $T_{calc}$, may be mathematically modelled based on equation (10):

$$T_{calc} = \frac{P_{dc}}{\omega * \eta} \quad (10)$$

The feed-forward algorithm 200 then moves on to block 210. At block 210, if the motor or electric machine is being controlled in the PWM switching mode, it is determined if a difference between the measured torque, $T_{calc}$, and the first estimated torque, $T_{est\_first}$, or the commanded torque, $T_{cmd}$, is greater than a first threshold. If the motor or electric machine is being controlled in the six-step switching mode at block 210, it is determined if a difference between the measured torque, $T_{calc}$, and the commanded torque, $T_{cmd}$, is greater than a second threshold or if a difference between the second estimated torque, $T_{est\_second}$, and the commanded torque, $T_{cmd}$, is greater than the second threshold. If the difference between the measured torque, $T_{calc}$, and the first estimated torque, $T_{est\_first}$, is greater than the first threshold in the PWM switching mode, the feed-forward algorithm 200 moves on to block 212, where the offset position (i.e., the signal representing the offset position) of the rotor position sensor 21 is adjusted by a first value and the motor armature current, $I_s^e$, relative to the phase angle, $\beta$ (which is now adjusted by the first offset value), is controlled according to equation (4) to drive the first estimated torque, $T_{est\_first}$ toward the commanded torque, $T_{cmd}$. If the difference between the measured torque, $T_{calc}$, and the commanded torque, $T_{cmd}$, or the difference between the second estimated torque, $T_{est\_second}$, and the commanded torque, $T_{cmd}$, is greater than the second threshold in the six-step switching mode, the feed-forward algorithm 200 moves on to block 212, where the offset position of the rotor position sensor 21 is adjusted by the first value and the motor armature voltage, $V_s^e$, relative to the phase angle, $\theta$ (which is now adjusted by the first offset value), is controlled according to equation (8) to drive the second estimated torque, $T_{est\_second}$, toward the commanded torque, $T_{cmd}$. It should be noted that the first value that the offset position is adjusted by may be different depending on the magnitude of correction required and/or depending on which switching mode (PWM or six-step) the system is operating in.

If none of the conditions are true (i.e., if the answer to the conditions is 'no') at block 210, the feed-forward algorithm 200 move on to block 214 where the measured DC power, $P_{dc}$, being output by the power source (e.g., battery 20), the estimated torque, $T_{est}$ (this could be either the first estimated torque, $T_{est\_first}$, or the second estimated torque, $T_{est\_second}$, depending on whether the system is operating in the PWM switching mode or the six-step switching mode), and the commanded torque, $T_{cmd}$, are monitored during steady state conditions just before and just after a transition between the PWM switching mode and the six-step switching mode. The feed-forward algorithm 200 then moves on to block 216.

At block 216, it is determined if a change in the DC power, $P_{dc}$, being output by the power source (e.g., battery 20) was observed during the transition between the PWM switching mode and the six-step switching mode and if that change in DC power, $P_{dc}$, exceeded a third threshold. If an observed change in the DC power, $P_{dc}$, did not exceed the third threshold, the feed-forward algorithm 200 ends at 218. If an observed change in the DC power, $P_{dc}$, did exceed the third threshold, the feed-forward algorithm 200 moves on to block 220.

At block 220, the feed-forward algorithm 200 determines a difference between the measured torque, $T_{calc}$, and the commanded torque, $T_{cmd}$, or a difference between the second estimated torque, $T_{est\_second}$, the commanded torque, $T_{cmd}$, exceeded a fourth threshold in the six-step switching mode during a steady state condition just before (if switching from the six-step mode to the PWM mode) or just after (if switching from the PWM mode to the six-step mode) the transition between the PWM switching mode and the six-step switching mode. If the difference between the measured torque, $T_{calc}$, and the commanded torque, $T_{cmd}$, or the difference between the second estimated torque, $T_{est\_second}$, and the commanded torque, $T_{cmd}$, did not exceed the fourth threshold in the six-step switching mode just before or just after the transition, the feed-forward algorithm 200 ends at 218. If the difference between the measured torque, $T_{calc}$, and the commanded torque, $T_{cmd}$, or the difference between the second estimated torque, $T_{est\_second}$, and the commanded torque, $T_{cmd}$, did exceed the fourth threshold in the six-step switching mode just before or just after the transition, the feed-forward algorithm 200 moves on to block 222.

If the condition at block 220 is satisfied then the position offset error can be calculated using equation (8) by comparing the difference between the commanded torque, $T_{cmd}$, and the second estimated torque, $T_{est\_second}$, or by comparing the difference between the commanded torque, $T_{cmd}$, and the measured torque, $T_{calc}$. The offset position error may then be used to correct both a small or large position offset error. In one possible implementation, the position offset error calculated could be compared against a pre-defined threshold to quantify large or small position offset error.

At block 222, the feed-forward algorithm 200 determines if a difference between the measured torque, $T_{calc}$, and the first estimated torque, $T_{est\_first}$, exceeded a fifth threshold in the PWM switching mode during a steady state condition just before (if switching from the PWM mode to the six-step mode) or just after (if switching from the six-step mode to the PWM mode) the transition between the PWM switching mode and the six-step switching mode. If the difference between the measured torque, $T_{calc}$, and the first estimated torque, $T_{est\_first}$, did exceed the fifth threshold in the PWM switching mode just before or just after the transition, the feed-forward algorithm 200 moves on to block 224.

If the transition was from the six-step mode to the PWM mode such that the motor or electric machine (e.g., M/G 18) is now being controlled according to the PWM switching mode, the offset position (i.e., the signal representing the offset position) of the rotor position sensor 21 is adjusted at block 224 by a second value and the motor armature current, $I_s^e$, relative to the phase angle, $\beta$ (which is now adjusted by the second offset value), is controlled according to equation (4) to drive the first estimated torque, $T_{est\_first}$ toward the commanded torque, $T_{cmd}$. If the transition was from the PWM mode to the six-step mode such that the motor or electric machine (e.g., M/G 18) is now being controlled according to the six-step switching mode, the offset position of the rotor position sensor 21 is adjusted by the second value and the motor armature voltage, $V_s^e$, relative to the phase angle, $\theta$ (which is now adjusted by the second offset value), is controlled according to equation (8) to drive the second estimated torque, $T_{est\_second}$, toward the commanded torque, $T_{cmd}$.

Returning to block 222, if the difference between the measured torque, $T_{calc}$, and the first estimated torque, $T_{est\_first}$, did not exceed the fifth threshold in the PWM switching mode just before or just after the transition, the feed-forward algorithm 200 moves on to block 226. At block 226, it is determined if a difference between the measured torque, $T_{calc}$, and the commanded torque, $T_{cmd}$, or if a difference between the first estimated torque, $T_{est\_first}$, and the commanded torque, $T_{cmd}$ was less than the fifth threshold in the PWM switching mode during a steady state condition just before (if switching from the PWM mode to the six-step mode) or just after (if switching from the six-step mode to the PWM mode) the transition between the PWM switching mode and the six-step switching mode. If the difference between the measured torque, $T_{calc}$, and commanded torque, $T_{cmd}$, and if the difference between the first estimated torque, $T_{est\_first}$, and commanded torque, $T_{cmd}$ was not less than the fifth threshold in the PWM switching mode just before or just after the transition, the feed-forward algorithm 200 ends at block 218. If the difference between the measured torque, Teac, and commanded torque, $T_{cmd}$, or if the difference between the first estimated torque, $T_{est\_first}$, and commanded torque, $T_{cmd}$ was less than the fifth threshold in the PWM switching mode just before or just after the transition, the feed-forward algorithm 200 moves on to block 228.

At block 228, the offset position (i.e., the signal representing the offset position) of the rotor position sensor 21 is adjusted by a third offset value. More specifically at block 228, the third offset value may be based on a change in value of the measured torque, $T_{calc}$, that occurred during the transition between the PWM mode and the six-step mode or a difference between the first estimated torque, $T_{est\_first}$, aeon d estimated torque, $T_{est\_second}$, just before and after the transition between the PWM mode and the six-step mode. The adjustment at block 228 may be for small offset errors in the offset angle of the rotor position sensor 21, while the adjustment at block 224 may be for large offset errors (relative to the adjustment at block 228) in the offset angle of the rotor position sensor 21. If the transition was to the PWM switching mode, the motor armature current, $I_s^e$, relative to the phase angle, β (which is now adjusted by the third offset value), is controlled according to equation (4) to drive the first estimated torque, $T_{est\_first}$ toward the commanded torque, $T_{cmd}$. If the transition was to the six-step switching mode the motor armature voltage, $V_s^e$, relative to the phase angle, θ (which is now adjusted by the second offset value), is controlled according to equation (8) to drive the second estimated torque, $T_{est\_second}$, toward the commanded torque, $T_{cmd}$.

A satisfied condition in block 222, reaffirms a large position offset error while if the condition in block 226 is satisfied then it points to a small position offset error. In one of the optimum implementations of this algorithm, the conditions at blocks 222 and 226 could be used to verify the values calculated using equation (8) at block 220.

It should be understood that the flowcharts in FIGS. 3 and 4 are for illustrative purposes only and that this disclosure should not be construed as limited to the flowcharts in FIGS. 3 and 4. Some of the steps may be rearranged while others may be omitted entirely. It should be further understood that the designations of first, second, third, fourth, etc. for estimated torques, offset values, thresholds, difference between values, or any other factor relevant to the flowcharts in FIG. 3 or 4 may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a battery;
    an electric machine configured to propel the vehicle, the electric machine having a stator and a rotor;
    a rotor position sensor;
    an inverter disposed between the battery and the electric machine, configured to convert DC electrical power from the battery into AC electrical power, configured to deliver the AC electrical power to the electric machine, configured to convert AC electrical power from the electric machine into DC electrical power, and configured to deliver the DC electrical power to the battery; and
    a controller programmed to,
        receive a signal from the rotor position sensor that is indicative of an angular position of the rotor,
        responsive to the inverter operating in a first switching mode, control an electric current being delivered to the stator relative to the angular position of the rotor to drive a first estimated torque of the electric machine toward a commanded torque,
        calculate a measured torque of the electric machine based on rotational speed of the rotor and a DC electrical power input from the battery to the electric machine via the inverter, and
        responsive to a difference between the measured torque and the first estimated torque exceeding a threshold, adjust the signal from the rotor position sensor to include a first offset value and control the electric current being delivered to the stator relative to the angular position plus the first offset value to drive the first estimated torque of the electric machine toward a commanded torque.

2. The vehicle of claim 1, wherein the controller is further programmed to, responsive to the inverter operating in a second switching mode, control an electric voltage being delivered to the stator relative to the angular position of the rotor to drive a second estimated torque of the electric machine toward the commanded torque.

3. The vehicle of claim 2, wherein the controller is further programmed to, responsive to a difference between the commanded torque and the measured torque or to a difference between the commanded torque and the second estimated torque exceeding a second threshold and to the inverter operating in the second switching mode, adjust the signal from the rotor position sensor to include a second offset value and control the electric current being delivered to the stator relative to the angular position plus the second offset value to drive the second estimated torque of the electric machine toward the commanded torque.

4. The vehicle of claim 2, wherein the controller is further programmed to, responsive to a transition from the first mode to the second mode resulting in a corresponding change in the DC electrical power input exceeding a third threshold and to a difference between the commanded torque and the second estimated torque or a difference between the commanded torque and the measured torque after the transition exceeding a fourth threshold, adjust the signal from the rotor position sensor to include a second offset value and control the electric voltage being delivered to the stator relative to the angular position plus the second offset value to drive the second estimated torque of the electric machine toward the commanded torque.

5. The vehicle of claim 2, wherein the controller is further programmed to, responsive to a transition from the second mode to the first mode resulting in a corresponding change in the DC electrical power input exceeding a third threshold and the difference between the commanded torque and the second estimated torque or the difference between the commanded torque and the measured torque before the transition exceeding a fourth threshold, adjust the signal from the rotor position sensor to include a second offset value and control the electric current being delivered to the stator relative to the angular position plus the second offset value to drive the first estimated torque of the electric machine toward the commanded torque.

6. The vehicle of claim 2, wherein the second switching mode is a six-step switching mode of operation.

7. The vehicle of claim 1, wherein the first switching mode is a pulse width modulation switching mode of operation.

8. A vehicle comprising:
a battery;
an electric machine configured to propel the vehicle, the electric machine having a stator and a rotor;
a rotor position sensor;
an inverter disposed between the battery and the electric machine, configured to convert DC electrical power from the battery into AC electrical power, configured to deliver the AC electrical power to the electric machine, configured to convert AC electrical power from the electric machine into DC electrical power, and configured to deliver the DC electrical power to the battery; and
a controller programmed to,
receive a signal from the rotor position sensor that is indicative of an angular position of the rotor,
responsive to the inverter operating in a first switching mode, control an electric voltage being delivered to the stator relative to the angular position of the rotor to drive a first estimated torque of the electric machine toward a commanded torque,
calculate a measured torque of the electric machine based on rotational speed of the rotor and a DC electrical power input from the battery to the electric machine via the inverter, and
responsive to a difference between the commanded torque and the measured torque or to a difference between the commanded torque and the first estimated torque exceeding a threshold, adjust the signal from the rotor position sensor to include a first offset value and control the electric current being delivered to the stator relative to the angular position plus the first offset value to drive the first estimated torque of the electric machine toward the commanded torque.

9. The vehicle of claim 8, wherein the controller is further programmed to, responsive to the inverter operating in a second switching mode, control an electric current being delivered to the stator relative to the angular position of the rotor to drive a second estimated torque of the electric machine toward the commanded torque.

10. The vehicle of claim 9, wherein the controller is further programmed to, responsive to a difference between the measured torque and the second estimated torque exceeding a second threshold and the to the inverter operating in the second switching mode, adjust the signal from the rotor position sensor to include a second offset value and control the electric current being delivered to the stator relative to the angular position plus the second offset value to drive the second estimated torque of the electric machine toward a commanded torque.

11. The vehicle of claim 9, wherein the controller is further programmed to, responsive to a transition from the second mode to the first mode resulting in a corresponding change in the DC electrical power input exceeding a third threshold and to a difference between the commanded torque and the second estimated torque or a difference between the commanded torque and the measured torque after the transition exceeding a fourth threshold, adjust the signal from the rotor position sensor to include a second offset value and control the electric voltage being delivered to the stator relative to the angular position plus the second offset value to drive the second estimated torque of the electric machine toward the commanded torque.

12. The vehicle of claim 9, wherein the controller is further programmed to, responsive to a transition from the first mode to the second mode resulting in a corresponding change in the DC electrical power input exceeding a third threshold and the difference between the commanded torque and the second estimated torque or the difference between the commanded torque and the measured torque before the transition exceeding a fourth threshold, adjust the signal from the rotor position sensor to include a second offset value and control the electric current being delivered to the stator relative to the angular position plus the second offset value to drive the first estimated torque of the electric machine toward the commanded torque.

13. The vehicle of claim 9, wherein the second switching mode is a pulse width modulation switching mode of operation.

14. The vehicle of claim 8, wherein the first switching mode is a pulse width modulation switching mode of operation.

15. A vehicle comprising:
a battery;
an electric machine configured to propel the vehicle, the electric machine having a stator and a rotor;
a rotor position sensor;
an inverter disposed between the battery and the electric machine, configured to convert DC electrical power from the battery into AC electrical power, configured to deliver the AC electrical power to the electric machine, configured to convert AC electrical power from the electric machine into DC electrical power, and configured to deliver the DC electrical power to the battery; and
a controller programmed to,
receive a signal from the rotor position sensor that is indicative of an angular position of the rotor,
responsive to the inverter operating in a first switching mode, control an electric current being delivered to the stator relative to the angular position of the rotor to drive a first estimated torque of the electric machine toward a commanded torque,
responsive to the inverter operating in a second switching mode, control an electric voltage being delivered to the stator relative to the angular position of the rotor to drive a second estimated torque of the electric machine toward the commanded torque, calculate a measured torque of the electric machine based on rotational speed of the rotor and a DC electrical power input from the battery to the electric machine via the inverter circuit, responsive to a transition from the first mode to the second mode resulting in a corresponding change in the DC electrical power input exceeding a first threshold and to a difference between the commanded torque and the second estimated torque or a difference between the commanded torque and the measured torque after the transition exceeding a second threshold, adjust the signal from the rotor position sensor to include a first offset value and control the electric voltage being delivered to the stator relative to the angular position plus the first offset value to drive the second estimated torque of the electric machine toward the commanded torque, and responsive to a transition from the second mode to the first mode resulting in a corresponding change in the DC electrical power input exceeding a third threshold and the difference between the commanded torque and the second estimated torque or the difference between the commanded torque and the measured torque before the transition exceeding a fourth threshold, adjust the signal from the rotor position sensor to include a second offset value and control the electric current being delivered to the stator relative to the angular position plus the second offset value to drive the first estimated torque of the electric machine toward the commanded torque.

16. The vehicle of claim 15, wherein the controller is further programmed to, responsive to the inverter operating in the first switching mode, the absence of a transition between modes, and a difference between the measured torque and the first estimated torque exceeding a fifth threshold, adjust the signal from the rotor position sensor to include a third offset value and control the electric current being delivered to the stator relative to the angular position plus the third offset value to drive the first estimated torque of the electric machine toward a commanded torque.

17. The vehicle of claim 15, wherein the controller is further programmed to, responsive to the inverter operating in the second switching mode, the absence of a transition between modes, and a difference between the commanded torque and the measured torque or to a difference between the commanded torque and the second estimated torque exceeding a fifth threshold, adjust the signal from the rotor position sensor to include a third offset value and control the electric current being delivered to the stator relative to the angular position plus the third offset value to drive the second estimated torque of the electric machine toward the commanded torque.

18. The vehicle of claim 15, wherein the first switching mode is a pulse width modulation switching mode of operation.

19. The vehicle of claim 15, wherein the second switching mode is a six-step switching mode of operation.

* * * * *